United States Patent [19]

Akiyama

[11] Patent Number: 4,779,704
[45] Date of Patent: Oct. 25, 1988

[54] DRAINING DEVICE FOR MUFFLER OF SMALL PLANING BOAT

[75] Inventor: Shigeyoshi Akiyama, Akashi, Japan

[73] Assignee: Kawasaki Jukogyo Kabushiki Kaisha, Japan

[21] Appl. No.: 936,755

[22] Filed: Dec. 2, 1986

[30] Foreign Application Priority Data

Dec. 27, 1985 [JP] Japan .................. 60-298970

[51] Int. Cl.$^4$ .................................. F01N 7/00
[52] U.S. Cl. ............................ 181/235; 181/260
[58] Field of Search ............ 181/233, 235, 259–262, 181/246

[56] References Cited

U.S. PATENT DOCUMENTS

| 900,576 | 10/1908 | Nelson et al. | 181/235 X |
| 3,431,882 | 3/1969 | Irgens | 181/235 X |
| 4,310,067 | 1/1982 | Thomson | 181/235 X |

FOREIGN PATENT DOCUMENTS 52-14920  4/1977  Japan .
58-30088  7/1983  Japan .

*Primary Examiner*—Benjamin R. Fuller

[57] ABSTRACT

A draining device for a muffler of a small planing boat in which engine cooling water is injected into the muffler. A draining hole is opened in the muffler, and to aforesaid draining hole is connected one end of a bypass hose with the other end opened to outside waters at a hull rear section.

2 Claims, 2 Drawing Sheets

DRAINING DEVICE FOR MUFFLER OF SMALL PLANING BOAT

FIELD OF THE INVENTION AND RELATED ART STATEMENT

This invention relates to a draining device for a muffler of a small planing boat.

In a small planing boat, as shown in FIG. 1, exhaust gas from an engine 2 installed in a boat hull is drawn off in front of the hull through a muffler 5 which consists of an expansion chamber 3 made of for instance stainless steel plate and a silencer 4 made of for example synthetic resin. In order to lower the temperature and noise of exhaust gas, cooling water in a water jacket (not shown) of the engine 2 is injected into the expansion chamber 3 in the muffler 5 and then let out of the hull 1 in the same route. In FIG. 1, Numeral 6 is a joint to connect the expansion chamber 3 and the silencer 4.

In high speed sailing the cooling water can be easily let out by such conventional draining device for muffler as described above, because a boat hull takes a nearly horizontal position and exhaust gas pressure is high.

In low speed sailing, however, as shown in FIG. 1, a boat hull 1 tends to incline with the bow going up, resulting in formation of a water collecting portion, and water accumulates in the expansion chamber 3—at a curved section between the down pipe and horizontal pipe. Reduced pressure of exhaust gas in low speed sailing further promotes this tendency. Therefore, the prior art has a drawback in that, when a hull 1 lists in a great degree, cooling water which gathers in a water collecting portion flows back into the engine 2.

OBJECT AND SUMMARY OF THE INVENTION

The purpose and object of the invention is to provide a draining device for muffler of a small planing boat which eliminates the drawback described above.

A draining device for a muffler of a small planing boat according to the invention comprises a draining hole drilled in a cooling water collecting portion of a muffler, and a bypass hose one end of which is connected to the draining hole with the other opened outside a boat hull at its rear section.

This configuration allows cooling water built up in a cooling water collecting portion of a muffler in low-speed sailing to be easily drawn out of a hull rear section through a water draining hole and a bypass hose.

BRIEF DESCRIPTION OF THE DRAWINGS

In the accompanying drawings, there are shown illustrative embodiments of the invention from which these and other of its objectives, novel features and advantages will be readily apparent.

In the drawings.

DETAILED DESCRIPTION OF THE PREFERRED EMBODIMENTS

Figure 1:
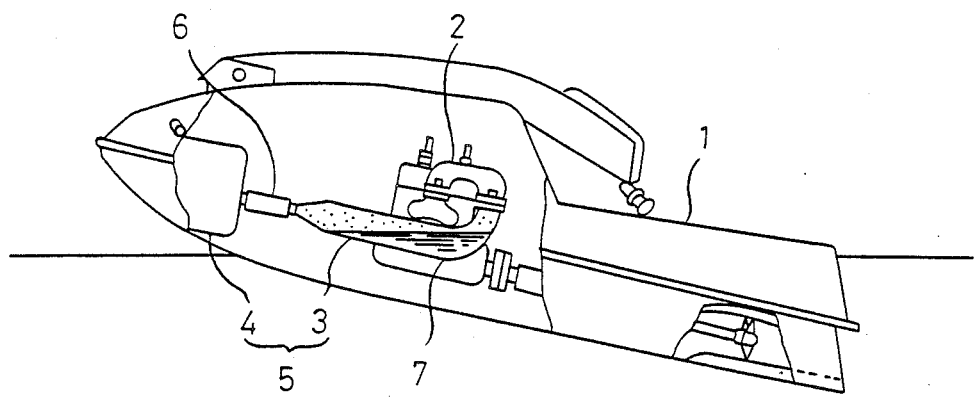
FIG. 1 is a fragmentary cutaway side view of a conventional type of small planing boat.
Figure 2:
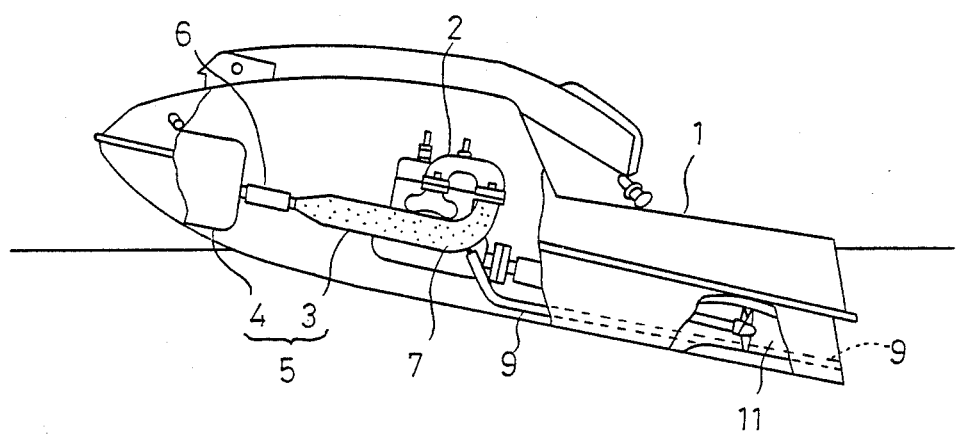
FIG. 2 is a fragmentary cutaway side view of a small planing boat with a draining device for muffler according to the invention.
Figure 3:
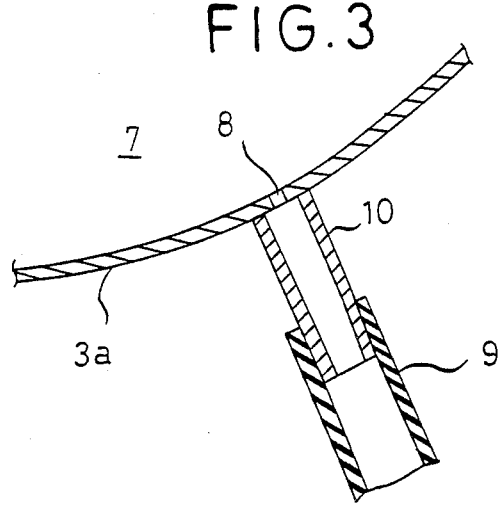
FIG. 3 is an enlarged sectional view showing a draining hole and its vicinities of the draining device in FIG. 2.

As shown in FIGS. 2 and 3, a draining hole 8 of 5 to 6 mm in diameter is opened in the vicinity of a lower wall 3a of an expansion chamber 3 (in FIG. 1) which tends to be a cooling water collecting portion 7, and around the draining hole a joint 10 is secured to connect hose. For example, a bypass hose 9 made of rubber is connected to the joint 10, and, as shown in FIG. 2, the bypass hose 9 extends to a propeller case 11 of a boat hull 1 and a rear end of the bypass hose 9 is opened out of the hull 1 at its rear section.

This configuration according to the invention allows cooling water which builds up in the water collecting portion 7 to be let out of a rear section of the hull 1 through the draining hole 8 and the bypass hose 9. Therefore, even in low-speed sailing, there is no water stagnation in the cooling water collecting portion 7, resulting in no chance of reverse flow of cooling water into an engine 2, even if the hull 1 should be overturned.

Because a diameter of the draining hole 8 is sufficiently small, there is little amount of exhaust gas which escapes out of the rear section of the hull 1 through the bypass hose 9, thus causing no significant deterioration of engine performance and no increase in total noise from exhaust gas fleeing out of the hull 1 at its rear section.

In the aforesaid embodiment, the bypass hose opens out of the hull at its rearmost end, while another embodiment according to the invention adopts a bypass hose which opens at a side wall of a rear section of a hull. More technically, experiments have shown that slightly less noise is produced when a bypass hose is extended to a rearmost end of a hull.

Figure 4:
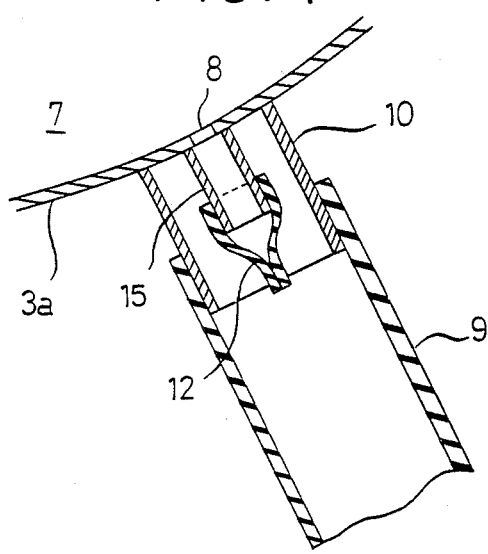
FIG. 4 is an enlarged sectional view showing another embodiment of a draining device with a check valve.
Figure 5:
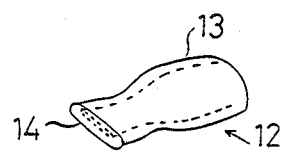
FIG. 5 is a sketch drawing showing a simplified check valve.

FIG. 4 shows another embodiment in which a separate small-schedule joint 15 communicating to a draining hole 8 is provided in a joint 10 for a bypass hose 9, and a check valve 12 is installed in the joint 11 to keep water from flowing into muffler from outside. This configuration prevents reverse flow of water from outside into a muffler 5 through a bypass hose 9 and a draining hole 8, when draft is lowered due to waves or heavy riders on board. FIG. 5 exemplifies a simple check valve 12—a wrought rubber tube 13 with an end normally closed like a slit 14. Alternatively, a valve which opens when engine is started, may be installed halfway in a bypass hose 9.

It will be clear to those skilled in the art that various changes may be made in the invention without departing from the spirit and scope thereof and therefore the invention is not limited by that which is shown in the drawings and described in the specification but only as indicated in the appended claims.

What is claimed is:

1. A device for draining off water collected in a muffler of a small planing boat having a hull, wherein engine cooling water is injected into the muffler and water builds up in a lower portion of the muffler, comprising
   a draining hole opened at said lower portion of said muffler, and
   a bypass hose having one end connected to said draining hole and another end opened out of the hull of said boat at a rear section thereof, and said draining hole and said bypass hose are used exclusively for draining said water collected in said lower portion of said muffler.

2. A device as claimed in claim 1, wherein a reverse flow preventive means is provided in the draining hole portion of said muffler.

* * * * *